(12) United States Patent
Albert et al.

(10) Patent No.: US 8,479,714 B2
(45) Date of Patent: Jul. 9, 2013

(54) VALVE WITH BYPASS DUCT INCORPORATING A HEATING MEMBER AND COMBUSTION ENGINE INTAKE CIRCUIT WITH PREHEATING OF THE AIR

(75) Inventors: Laurent Albert, Vallangoujard (FR); Michael Maitre, Cergy le Haut (FR); Yohan Comorassamy, Cergy le Haut (FR)

(73) Assignee: Valeo Systems de Controle Moteur, Cergy Saint Christophe (FR)

( * ) Notice: Subject to any disclaimer, the term of this patent is extended or adjusted under 35 U.S.C. 154(b) by 575 days.

(21) Appl. No.: 12/374,492

(22) PCT Filed: Jul. 5, 2007

(86) PCT No.: PCT/FR2007/001142
§ 371 (c)(1),
(2), (4) Date: May 19, 2009

(87) PCT Pub. No.: WO2008/012408
PCT Pub. Date: Jan. 31, 2008

(65) Prior Publication Data
US 2009/0320808 A1    Dec. 31, 2009

(30) Foreign Application Priority Data
Jul. 25, 2006    (FR) ....................... 06 06803

(51) Int. Cl.
*F02G 5/00* (2006.01)
*F16K 1/22* (2006.01)
*F16K 11/085* (2006.01)

(52) U.S. Cl.
USPC ................ 123/556; 251/305; 137/625.45

(58) Field of Classification Search
USPC ................ 123/556; 251/305; 137/625.45
See application file for complete search history.

(56) References Cited

U.S. PATENT DOCUMENTS

| 1,830,867 | A | * | 11/1931 | Alleas ......................... 123/556 |
| 2,803,235 | A | * | 8/1957 | Goschel et al. ............. 123/365 |
| 3,920,066 | A | * | 11/1975 | Kirchhoff ..................... 165/4 |
| 4,329,963 | A | * | 5/1982 | Granger ...................... 123/552 |
| 4,445,480 | A |   | 5/1984 | Inoue et al. |
| 4,922,879 | A | * | 5/1990 | Kaji et al. ..................... 123/494 |
| 5,662,084 | A | * | 9/1997 | Deguchi et al. .......... 123/339.11 |

(Continued)

FOREIGN PATENT DOCUMENTS

| DE | 42 04 011 C1 | 2/1992 |
| DE | 41 09 436 C1 | 5/1992 |

(Continued)

OTHER PUBLICATIONS

International Search Report w/translation from PCT/FR2007/001142 dated Jan. 17, 2008 (6 pages).

*Primary Examiner* — Lindsay Low
*Assistant Examiner* — Tea Holbrook
(74) *Attorney, Agent, or Firm* — Osha Liang LLP

(57) ABSTRACT

A valve for a combustion engine air intake circuit, where the valve includes a main pipe and a bypass duct with upstream and downstream ends opening into the main pipe. The valve also includes a heating member that is positioned in the bypass duct and a shut-off member mounted such that it can move between a first position in which airflow can pass through the main pipe and a second position in which airflow can pass through the bypass duct.

5 Claims, 2 Drawing Sheets

U.S. PATENT DOCUMENTS

| | | | |
|---|---|---|---|
| 6,102,012 A * | 8/2000 | Iiboshi et al. | 123/556 |
| 6,357,423 B1 * | 3/2002 | Kanno | 123/497 |
| 6,814,052 B2 * | 11/2004 | Weiss et al. | 123/350 |
| 7,013,869 B2 * | 3/2006 | Nagano et al. | 123/339.23 |
| 2003/0217739 A1 * | 11/2003 | Saeki et al. | 123/543 |
| 2004/0112342 A1 * | 6/2004 | Watanabe | 123/549 |
| 2009/0049832 A1 * | 2/2009 | Hase | 60/320 |

FOREIGN PATENT DOCUMENTS

| | | |
|---|---|---|
| EP | 0 723 100 A1 | 7/1996 |
| JP | 57070348 A * | 4/1982 |
| JP | 60113058 A * | 6/1985 |
| JP | 61 072859 A | 4/1986 |
| JP | 2000 110951 A | 4/2000 |

* cited by examiner

VALVE WITH BYPASS DUCT INCORPORATING A HEATING MEMBER AND COMBUSTION ENGINE INTAKE CIRCUIT WITH PREHEATING OF THE AIR

The present invention relates to a valve for an air intake circuit for a heat engine that can be used for example to move a motor vehicle. A further subject of the invention is a heat engine air intake circuit.

BACKGROUND OF THE INVENTION

The supply of a heat engine consists mainly in inserting into a combustion chamber an intake air flow and a liquid fuel vaporized in the intake air flow. The mixture of the air flow and the fuel is achieved in the combustion chamber or upstream of the latter in the intake circuit of the heat engine.

With certain fuels, such as diesel, the starting of the engines is made difficult when the ambient temperature is below approximately 5° C.: the temperature of the air-diesel mixture at the end of compression is not sufficient to cause the mixture to self-ignite. This results in difficulties, if not an impossibility, of starting the heat engine, and an imperfect combustion so long as the engine is not hot enough.

To prevent this disadvantage, it is known practice to heat up the air-diesel mixture by means of a heating system consisting of preheating plugs installed in the cylinder head of the heat engine in order to lead either directly into the combustion chamber or into the turbulence chamber of the heat engine. This heating system is relatively costly because of the necessary installation of plugs on the cylinder head, an installation that also has an influence on the space requirement of the cylinder head.

It is also known practice to heat the intake air by means of a heating grid extending into the intake duct. Because of the pressure losses caused by the grid, this heating device can be used only in heat engines of large cubic capacity.

OBJECT OF THE INVENTION

It would therefore be of value to have a means making it possible to make the starting of heat engines easier.

SUMMARY OF THE INVENTION

For this reason, according to the invention, provision is made of a valve for an air intake circuit of a heat engine, characterized in that it comprises a main duct and a bypass channel having upstream and downstream ends leading into the main duct, a heating member being placed in the bypass channel and the valve comprising a shutoff member mounted so as to be movable between a first position for the passage of an air flow in the main duct and a second position for the passage of an air flow in the bypass channel.

The air flow is thereby heated during its passage in the bypass channel. The heating is rapid and requires only a relatively moderate power. Such a heating may also be easily applied for a relatively low cost and the heat engine has a relatively simple structure. In addition, in normal operating mode, most if not all of the intake air flow passes into the main duct so that the heating member which extends into the bypass channel causes no pressure loss.

A further subject of the invention is an air intake circuit for a heat engine, comprising a main duct and a shutoff member mounted in the main duct in order to be able to move between an open position of the duct and a shutoff position of the main duct, a heating member being placed in a bypass channel having upstream and downstream ends leading into the main duct.

Other features and advantages of the invention will emerge on reading the following description of a particular nonlimiting embodiment of the invention.

BRIEF DESCRIPTION OF THE DRAWINGS

Reference will be made to the appended drawings amongst which.

DETAILED DESCRIPTION OF THE INVENTION

Figure 1:
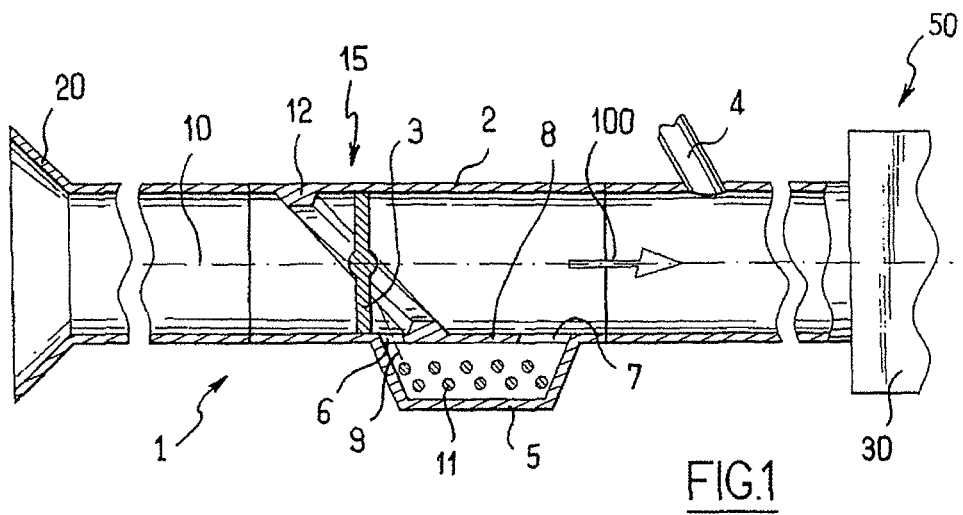
FIG. 1 is a partial schematic view of a heat engine according to the invention, the butterfly element being in the shutoff position.
Figure 2:
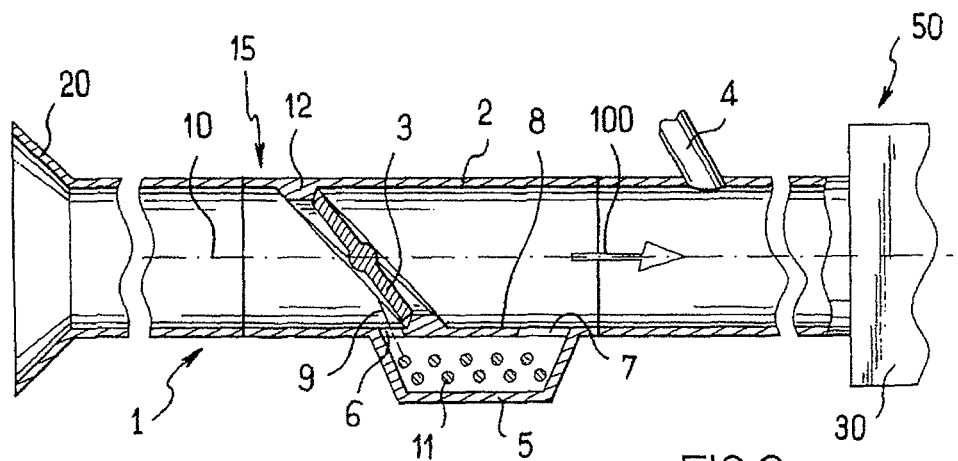
FIGS. 2 and 3 are views similar to FIG. 1, the butterfly element being respectively in the bypass position and in the totally open position.

The invention is described in this instance in application to a heat engine, more precisely an internal combustion heat engine, operating by means of a diesel-based fuel. The invention can however be applied to engines operating with other types of fuel, for example of petroleum origin or of biological origin, such as diester.

The heat engine generally indicated as 50, schematized in the figures, comprises an air intake circuit, generally indicated as 1.

The intake circuit 1 comprises a duct having one end connected to an outside air inlet 20 and an opposite end leading into the combustion chambers of the heat engine (schematized as 30 in the figures).

A valve, generally indicated as 15, is mounted on the intake circuit 1. The valve 15 comprises a main duct 2 having ends connected in a manner known per se to the intake circuit duct 1.

Figure 3:
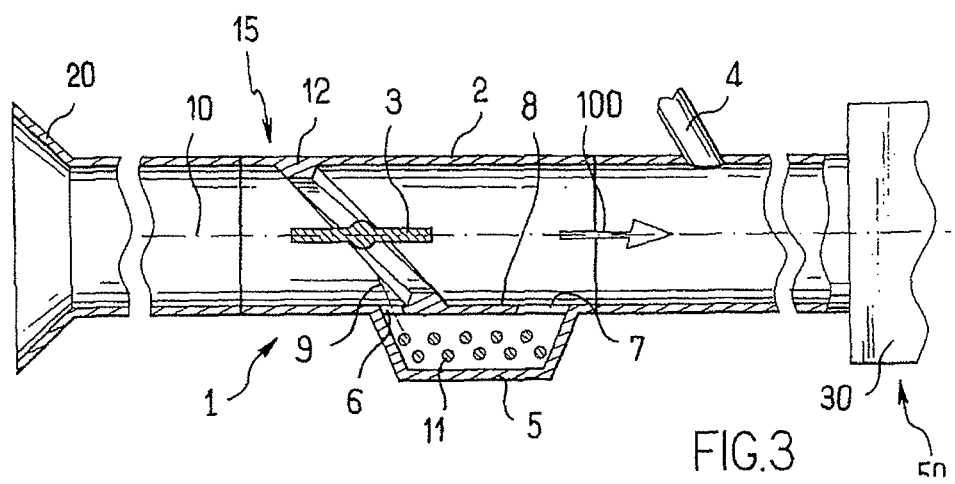

A butterfly element 3 is mounted in a manner known per se in the main duct 2 via a spindle whose ends are received so as to pivot in bearings secured to the main duct 2 so that the butterfly element 3 can pivot between a shutoff position of the main duct 2 (shown in FIG. 1) in which the butterfly element 3 is perpendicular to the axis of the main duct 2 and prevents air from circulating in the main duct 2, and an open position of the main duct 2 (shown in FIG. 3) in which the butterfly element 3 is parallel to the axis of the main duct 2. The butterfly element 3 is arranged and controlled in a manner known per se so as to be able to be held in intermediate positions between the shutoff and open positions so as to regulate the air flow rate in the main duct 2.

A fuel injector 4 leads into the main duct 2 downstream of the butterfly element 3 with reference to the direction of travel of the air flow toward the combustion chambers (symbolized by the arrow 100). The injector 4, being a conventional injector, forms part of a fuel circuit, known per se, connected to a fuel tank in order to bring the fuel up to the main duct 2.

The valve 15 comprises a bypass channel 5 extending parallel to the main duct 2. The bypass channel 5 comprises an upstream end 6 and a downstream end 7 leading onto a lateral surface 8 of the main duct 2 respectively upstream and downstream (with reference to the direction of travel 100) of the butterfly element 3 in an intermediate position between the shutoff position and the open position. This intermediate position of the butterfly element 3 is a bypass position in which the butterfly element 3 is slightly inclined relative to its shutoff position and has its peripheral edge in the vicinity of a seat 12 formed by a step extending as a protrusion into the duct. The upstream and downstream ends 6, 7 lead onto either side of the seat 12 at points of the main duct 2 that are substantially equidistant from the points of attachment of the spindle of the butterfly element 3 to the duct 2.

The upstream end 6 has a spindle 9 that is inclined relative to the central axis 10 of the main duct 2 forming with the latter an acute angle at the top oriented toward the external air inlet. The butterfly element 3 in its bypass position extends substantially parallel to the spindle 9 of the upstream end 7 in order to guide the air flow toward the bypass channel 5.

The main duct 2 and the bypass channel 5 are for example made of aluminum.

A heating member 11, in this instance resistors, is placed in the bypass channel 2. The resistors may be for example of the PTC (Positive Temperature Coefficient) type. The heating member 11 is designed to allow the air temperature to rise up to a temperature allowing the mixture to reach, at the end of compression in the combustion chamber, a sufficient temperature to cause its self-ignition and bring about the starting of the engine. As an example, for an outside temperature of −20° C., the power delivered by the heating member 11 is of the order of 300 W. The heating member 11 is temperature-regulated so as not to reach the self-ignition temperature ("flash point") of the fuel or of the engine oil and so as to protect the surrounding components.

To start the engine, the butterfly element 3 is controlled into its bypass position, an intake air flow travels toward the combustion chambers passing through the bypass channel 5 so that the air flow is heated when it arrives at the injector 4. Thus heated, the air itself heats the fuel leaving the injector 4. So long as the starting phase has not finished, and even so long as the engine has not reached its minimal temperature of nominal operation, the butterfly element 3 is controlled so as to force at least a portion of the air flow to travel toward the bypass channel 5 in order to benefit from the heating provided by the heating member 11.

It will be noted that, at the low air flow rates encountered during the starting and low-load operation of the engine, the bypass channel causes only a little pressure loss and does not disrupt the operation of the engine despite the air passing through the heating resistor.

The bypass channel 5 has a smaller cross section than that of the main duct so that, when the starting phase is finished and the butterfly element 3 finally leaves its bypass position to go to its open position, the air flow travels through the main duct 2 without the bypass channel 5 and the heating member 11 disturbing the flow thereof. The supply of the heating member 11 may be switched off automatically at the end of starting or when the engine has reached its operating temperature.

Naturally, the invention is not limited to the embodiment described and it is possible to apply thereto variant embodiments without departing from the context of the invention as defined by the claims.

In particular, the bypass channel may extend upstream or downstream of the butterfly element 3 and/or of the injector 4.

The valve may be used as an air metering valve making it possible to create a negative pressure in the air intake duct in order to promote the passage, into the air intake circuit downstream of the valve, of recycled gases originating from the exhaust circuit.

Figure 4:
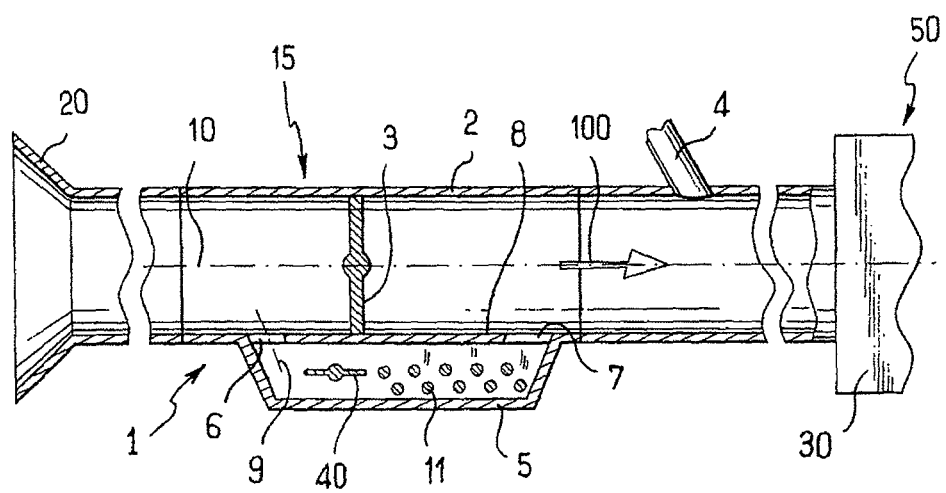
FIG. 4 is a view similar to that of FIG. 1 illustrating a variant embodiment.

As a variant, as shown in FIG. 4, the butterfly element 3 has only two positions, namely a shutoff position and an open position. The bypass channel 5 has its upstream and downstream ends 6 and 7 leading respectively to the upstream and downstream of the butterfly element 3 in the shutoff position. An independent valve element 40 is mounted, upstream of the bypass channel 5, of the heating member 11.

The heating member may have a structure that differs from that described and for example a coil or grid structure.

The heat engine may have a structure that differs from that described. The shutoff member of the intake circuit may be different from a butterfly element and comprise for example a sliding valve element.

It is possible to carry out preheating before the actual starting operation in order to dispense with the response times of the heating elements (initiating the heating when the doors are unlocked for example).

The numbered values have been given only as an indication and may be modified according to the architecture of the engine, its cubic capacity etc.

The duct of the intake circuit may be in one piece and the bypass channel fitted to the latter or the duct and the bypass channel may be made in a single piece.

The invention claimed is:

1. A valve for an air intake circuit of a heat engine, comprising:
   a main duct;
   a shutoff member mounted in the main duct and configured to move between an open position of the main duct and a shutoff position of the main duct; and
   a bypass channel having upstream and downstream ends leading into the main duct,
   wherein a heating member is placed in the bypass channel;
   wherein the shutoff member comprises an intermediate bypass position, and the upstream and downstream ends lead onto either side of the shutoff member in the intermediate bypass position;
   wherein a liquid fuel supply member is connected to the main duct, and the heating member is placed in the intake circuit upstream of the liquid fuel supply member; and,
   wherein only intake air is heated prior to mixing with liquid fuel.

2. The valve as claimed in claim 1, wherein the shutoff member is a butterfly element mounted so as to pivot between the open position and the shutoff position, the upstream end of the bypass channel, wherein the butterfly element is arranged so that the butterfly element in the bypass position guides the intake air to the upstream end of the bypass channel.

3. An air intake circuit for a heat engine, comprising the valve according to claim 1.

4. An air intake circuit for a heat engine, comprising:
   a main duct; and
   a shutoff member mounted in the main duct in order to be able to move between an open position of the main duct and a shutoff position of the main duct,
   wherein a heating member is placed in a bypass channel having upstream and downstream ends leading into the main duct;
   wherein the shutoff member comprises an intermediate bypass position and the upstream and downstream ends lead onto either side of the shutoff member in the intermediate bypass position;
   wherein a liquid fuel supply member is connected to the main duct, and the heating member is placed in the intake circuit upstream of the liquid fuel supply member; and,
   wherein only intake air is heated prior to mixing with liquid fuel.

5. The circuit as claimed in claim 4, wherein the shutoff member is a butterfly element mounted so as to pivot between the open position and the shutoff position, wherein the upstream end of the bypass channel and the butterfly element are arranged so that the butterfly element in the bypass position guides the intake air to the upstream end of the bypass channel.

* * * * *